Figure 3:
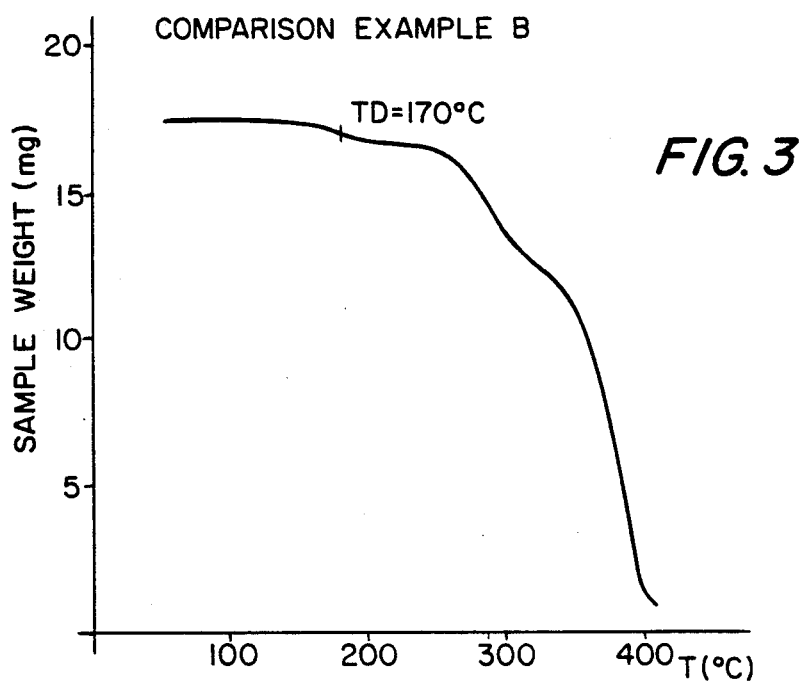

United States Patent [19]

Siol et al.

[11] Patent Number: 4,877,853

[45] Date of Patent: Oct. 31, 1989

[54] POLYMETHYL METHACRYLATE MOLDING COMPOUNDS

[75] Inventors: Werner Siol, Darmstadt; Ernst Heil, Stockstadt; Franz Wenzel, Darmstadt; Peter J. Arndt, Seeheim-Jugenheim; Ulrich Terbrack, Reinheim, all of Fed. Rep. of Germany

[73] Assignee: Röhm GmbH, Darmstadt, Fed. Rep. of Germany

[21] Appl. No.: 235,707

[22] Filed: Aug. 19, 1988

Related U.S. Application Data

[63] Continuation of Ser. No. 34,684, Apr. 6, 1987.

[30] Foreign Application Priority Data

Apr. 16, 1986 [DE] Fed. Rep. of Germany ........ 3612791

[51] Int. Cl.$^4$ ........................................... C08F 120/18
[52] U.S. Cl. .................................................. 526/329.7
[58] Field of Search ..................................... 526/329.7

[56] References Cited

U.S. PATENT DOCUMENTS

| | | | |
|---|---|---|---|
| 2,450,000 | 9/1948 | Hawk | 260/83 |
| 3,637,545 | 1/1972 | Fivel | 526/329.7 |
| 3,882,198 | 5/1975 | Miller | 260/889 |
| 4,661,571 | 4/1987 | Kato et al. | 526/329.7 |

FOREIGN PATENT DOCUMENTS

| | | | |
|---|---|---|---|
| 1745763 | 3/1970 | Fed. Rep. of Germany | 526/329.7 |
| 1645232 | 10/1970 | Fed. Rep. of Germany | . |
| 2917321 | 11/1980 | Fed. Rep. of Germany | . |
| 54-99190 | 8/1979 | Japan | 526/329.7 |
| 55-116711 | 9/1980 | Japan | 526/329.7 |
| 1075273 | 7/1967 | United Kingdom | . |
| 1181925 | 2/1970 | United Kingdom | 526/329.7 |

OTHER PUBLICATIONS

C.A. 84:60229a (1976).
C.A. 94:85089z (1981).
Cacioli et al., Polymer Bulletin 11, 325 (1984).
Smith, J. Am. Chem. Soc. 68, 2060-2064 (1946).
Bywater et al., Polymer 13, 94 (1972).
Elias Makromoleküle, 2nd Ed., Huthig & Wepf Verlag, Basel, pp. 461, 462.
Kunstoff-Handbuch, vol. IX, Carl Hanser Verlag, München, 1975, pp. 22-35.
Methoden der Organischen Chemie, vol. XIV/1, pp. 145 and 1048-1053, 4th Ed.
Ullmanns Encyklopaedie, vol. 19, pp. 11-13, 22-27, and 132-134; vol. 13, p. 601; vol. 15, p. 191.
Kirk-Othmer, Third Edition, vol. 18, pp. 742-743.

*Primary Examiner*—Joseph L. Schofer
*Assistant Examiner*—N. Sarofim
*Attorney, Agent, or Firm*—Curtis, Morris & Safford

[57] ABSTRACT

A method for making a thermoplastically processable polymer by emulsion polymerizing at least 80 percent by weight of methyl methacrylate monomer with up to 20 percent by weight of at least one other monomer in an aqueous phase at a temperature from 0° C. to 100° C. in the presence of a polymerization initiator and a chain transfer agent in a molar ratio from 1:2 to 1:100,000, said chain transfer agent being from 0.01 to 5 percent by weight of said monomers, and then separating said polymer and said aqueous phase.

13 Claims, 2 Drawing Sheets

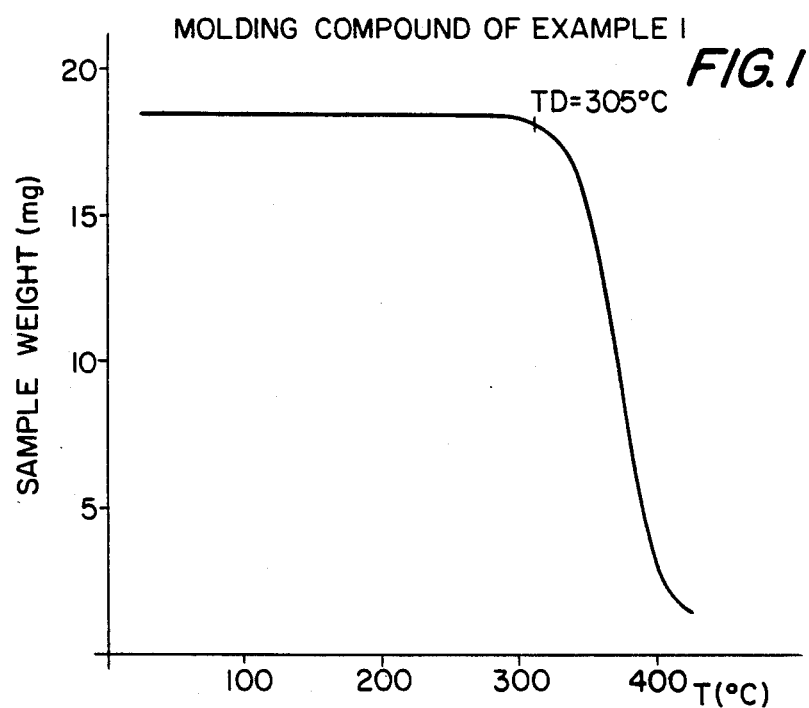
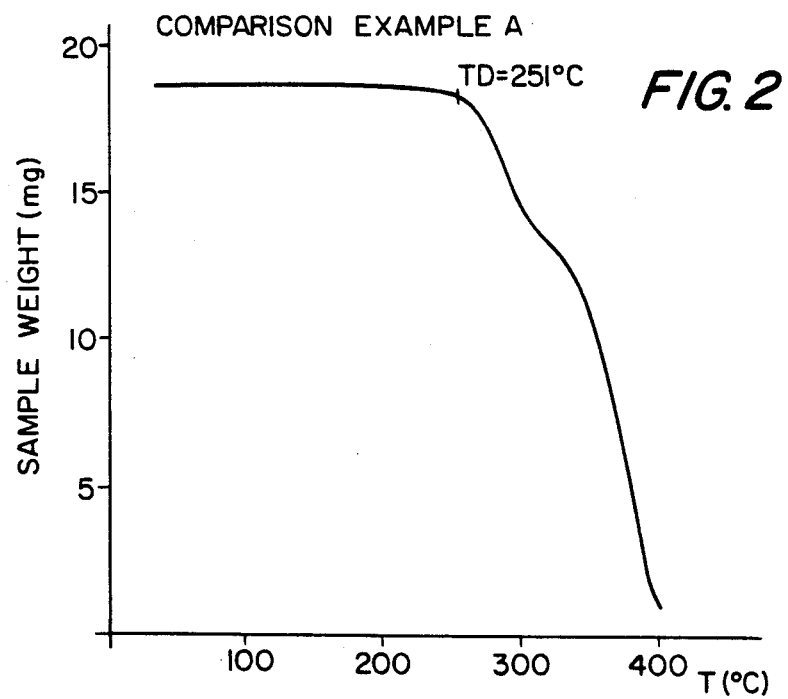

POLYMETHYL METHACRYLATE MOLDING COMPOUNDS

This application is a continuation of application Ser. No. 034,684 filed Apr. 6, 1987.

FIELD OF THE INVENTION

The present invention relates to molding compositions comprising polymethyl methacrylate, to methods for making the same, and to shaped articles made therefrom having excellent thermal stability (and hence good processability) and a relatively high heat distortion temperature.

The Prior Art

Polymethacrylate molding compounds or molding compositions are usually produced by discontinuous or continuous bulk polymerization or by bead polymerization. The discontinuous process, which is carried out at low temperatures above 20° C., is very time consuming and labor intensive, which is why it has been supplanted almost completely of late by continuous but technically complicated polymerization methods. Namely, polymerization is now carried out in a polymerization apparatus designed as extruder in a zone thereof wherein the temperature rises from 130° C. to 250° C., for example. Before the polymer is isolated as extrudate, unreacted monomer, which may amount to as much as 40 percent of the starting monomer, is drawn off under vacuum in a degassing zone and recycled to polymerization.

In the third process, bead polymerization, the polymerization has to be carried out at temperatures of about 100° C. and in the presence of relatively high initiator concentrations if practical space-time yields are to be obtained. See, for instance, *Kunststoff-Handbuch*, ("Polymer Handbook"), Vol. IX, Polymethacrylate, pp. 22–35, Carl Hanser Verlag, Munich, 1975, and *Ullmanns Enzyklopadie der technischen Chemie* ("Encyclopedia of Technical Chemistry"), 4th Ed., Vol. 19, pp. 22–27.

The production of polymethyl methacrylate (PMMA) molding compositions by solution polymerization followed by evaporation of the solvent is also known in the art.

For thermal stabilization of polymethyl methacrylate molding compositions, the methyl methacrylate is usually copolymerized with a few percent of an acrylic ester or with styrene.

Polymerizations for making thermoplastically processable polymethyl methacrylate compositions are generally carried out in the presence of chain transfer agents, primarily mercaptans, which intervene in the polymerization mechanism as chain terminators and in this way influence the degree of polymerization and the chemical structure of the polymer end groups. With mercaptans as the most widely known chain transfer agents, polymers are thus generally formed which possess greater numbers of more thermally stable end groups than do polymethyl methacrylates produced without the use of such modifiers. (Cf. German Patent Publication 16 45 232).

The nature of the end group is of special importance for the thermal stability of polymethyl methacrylate molding compositions. For example, it has been shown in model experiments [Cf. P. Cacioli et al., Polymer Bulletin 11, 325 (1984)] that polymethyl methacrylate chains with saturated end groups, such as are formed by chain transfer, are stable at temperatures of up to 300° C. and higher, whereas polymer chains which have been formed by disproportionation termination and consequently have an olefinic double bond at the end of the chain already break down at 255° C. PMMA chains which are terminated by recombination (coupling) are particularly unstable. These polymer chains are stable only up to 190° C.

To achieve satisfactory thermal stabilization, commercial production processes advantageously combine (1) the introduction of acrylic esters and (2) polymerization in the presence of mercaptans. In addition, low molecular weight stabilizers are added to improve processing.

It is further known that the steric structure of polymethyl methacrylate influences its physical properties. The steric configuration of polymers, known as tacticity, can be varied over a wide range as a function of the polymerization method. For example, while polymerization with phenylmagnesium bromide in toluene at 0° C. yields a nearly pure isotactic product, a highly syndiotactic product is obtained when Ziegler catalysts are used in the same solvent at −90° C. [Cf. S. Bywater et al., Polymer, 13, 94 (1972)].

Depending on the reaction temperature, free radical polymerization yields polymers of differing tacticity. With decreasing polymerization temperature, the syndiotactic portion of the polymer increases, which manifests itself physically in an increase in the glass transition temperature as expressed by the Vicat softening point, for example. (Kunstoff-Handbuch IX, pp. 28–29).

While bulk polymerization at low temperatures, for example 40° C., does yield a polymethyl methacrylate molding compound having the desired tacticity (a high proportion of syndiotactic and heterotactic triads), that is a molding composition with a relatively high heat distortion temperature, a relatively high initiator concentration must be used if high space-time yields are to be obtained. As a consequence, polymer chains are increasingly formed which are terminated by coupling or by disproportionation, in other words polymer chains having end groups which according to P. Cacioli et al., loc. cit., make low thermal stability appear likely. On the other hand, polymerization at an elevated temperature, for example 180° C., by a continuous method will give polymers with good thermal stability in good space-time yields even with relatively small amounts of initiator. However, because of the high polymerization temperature, a polymer with a lower heat distortion temperature will be obtained due to the altered tacticity. The copolymerization of about 1 to 10 weight percent of an acrylic ester, frequently resorted to with a view to improving the thermal stability, will bring about the desired improvement, but only at the cost of a significant reduction of the heat distortion temperature.

Thus, the prior art methods described above preclude the economic production of a polymethyl methacrylate molding composition that has both a high heat distortion temperature and high thermal stability.

THE OBJECT OF THE INVENTION

It was thus an object of the present invention to provide an economical commercial process for the production of polymethyl methacrylate molding compositions having both an elevated heat distortion temperature and high thermal stability.

In other words, it was sought to bridge the existing gap between PMMA molding compositions having either a high heat distortion temperature or high processing stability, but not both.

It has been found that, surprisingly, polymethyl methacrylate molding compositions can be produced which have both significantly better heat distortion temperatures, that are temperatures which is about 10° C. to 15° C. higher than those of the prior art, as well as a very good processing stability that also represents an improvement over the prior art.

Polymethyl methacrylate molding compositions possessing this favorable combination of properties are obtained by the emulsion polymerization of methyl methacrylate, or by the emulsion polymerization of a monomer mixture containing, in addition to methyl methacrylate, up to about 20 percent by weight of one or more other compounds that are copolymerizable with methyl methacrylate, in high space-time amounts of chain transfer agents are used for the polymerization.

The novel molding compounds can be recovered from the emulsions as a solid by precipitation or spray drying, for example, or advantageously by freeze coagulation or by extruder pinch-off. A molding composition is so obtained which upon processing gives molded articles of good optical quality, for example light transmittances in an unpigmented state of better than 91 percent. One advantage of the novel process for the production of polymethacrylate molding compositions is that the polymethacrylate molding compositions produced by this process contain only a very small amount of residual monomer (less than 0.5 weight percent, preferably less than 0.3 weight percent, and most preferably less than 0.1 weight percent) in comparison with the corresponding prior art molding compositions. Moreover, the processed molding composition, that is the finished molded article, also has a low content of residual monomer. This is because of the exceptionally good thermal stability of the molding compositions in accordance with the invention.

With a heat distortion temperature of about 120° C., measured as the Vicat softening point in conformity with DIN 53460, in contrast with the standard value of about 108° C. of a commercial polymethyl methacrylate molding composition, and good thermal processability with high thermal stability, the polymer represents a novel polymethacrylate molding compound.

Practice of the Invention

Emulsion polymerizations, also with methyl methacrylate, have long been carried out on both laboratory and industrial scales and are described, for example, in *Methoden der organischen Chemie* ("Methods of Organic Chemistry") Vol. XIV/1 (Houben-Weyl) (1961), *Makromolekulare Stoffe* ("Macromolecular Materials"), p. 145 or pp. 1048–1053, and in *Ullmanns Enzyklopadie der technischen Chemie*, 4th Ed., Vol. 13, p. 601; Vol. 15, p. 191 and Vol. 19, pp. 132 et seq. Acrylate dispersions which also contain methyl methacrylate and other methacrylate monomers as comonomers are of commercial importance as paints and in various coating applications. The concurrent use of chain transfer agents, mostly sulfur compounds such as longer chain alkyl mercaptans and thioglycolic esters, in their production for control of the molecular weight is known. Although emulsion polymerizations of methyl methacrylate have already been carried out in the presence of mercaptans such as n-amyl mercaptan at 50° C. in connection with chain transfer agent studies (cf. Smith, J. Am. Chem. Soc. 68, 2060, 1946), no polymethyl methacrylates have heretofore been known which, like those of the present invention, can be processed as molding compounds, have a high thermal stability comparable to that of PMMA molding compositions produced continuously at high temperatures, are distinguished by a heat distortion temperature not attained up to now by PMMA molding compounds, possess good optical properties, and are produced by emulsion polymerization.

The work done up to now on emulsion polymerization has concentrated mainly on products wherein the pronounced state of fine subdivision of emulsion polymers is a factor, as, for example, in the case of PMMA as a processing aid for polyvinyl chloride, or such work has been done on impact strength modifiers, since emulsion polymerization permits a desired structure of rubbery particles to be obtained.

The polymethyacrylate molding compositions of the present invention having high heat distortion temperatures and high thermal stability can be characterized as follows. At least 75, preferably at least 90, and most preferably at least 95, percent by weight of the polymer molecules are structured according to the formula

$$X\text{---}M]_nY, \qquad (I)$$

wherein M represents the monomer units and n the degree of polymerization, X represents in particular a portion of the chain transfer agent, XY, and more particularly X—H, which includes primarily mercaptans, X—H=AS—H, but also other chain transfer agents such as optionally substituted aliphatic or aromatic hydrocarbons having a labile or active H atom. The molding composition of the invention is further characterized by the fact that less than 5 percent of the tacticity of the polymer chain $[M]_n$, measured as triads, is isotactic and that as a rule more than 60 percent is syndiotactic. Polymer chains where less than 3 weight percent are isotactic are particularly preferred.

The polymethacrylate molding compositions of the invention are composed of monomers in accordance with formula (II) below in the molar proportions (a), (b), (c), and (d). However, formula (II) is not intended to give any information concerning the actual structure of the polymer chains, that is the sequence of the various monomers within the polymer.

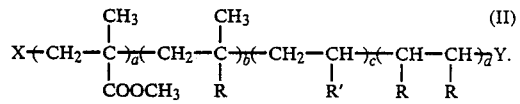

At least 75, preferably at least 90, and most preferably at least 95 percent by weight of the polymer molecules of the composition depicted in formula II contain end groups with X at one end of the molecule and, at the hydrogen atom. [See formula (I)].

In formula (II) above,

, R=—CN, —COOR", or —CONHR''', or R and R may be taken together in component (d) as forming a carboxylic acid anhydride bridge or, preferably, an imide bridge substituted with R", R"=H, alkyl or alkenyl having 2 to 6 carbon atoms, cycloalkyl having 5 to 12 carbon atoms, or aryl having 6 to 12 carbon atoms,

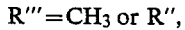

R'''=CH₃ or R",

R'=R, R", R"', or OCOR"', a, b, c, and d are mol fractions whose sum is unity and (a) = from 0.8 to 1, preferably from 0.95 to 1, and most preferably from 0.98 to 1, (b) = from 0 to 0.2, preferably from 0 to 0.05, and most preferably from 0 to 0.02, (c) = from 0 to 0.2, preferably from 0 to 0.05, and most preferably from 0 to 0.02, (d) = from 0 to 0.2, preferably from 0 to 0.05, and most preferably from 0 to 0.02, and X = a portion of the chain transfer agent XY, including in particular mercaptans ASH wherein X=AS, wherein A is aliphatic or aromatic having 1 to 18 carbon atoms and which may also contain further functional groups, for example carboxyl groups or ester groups or OH groups.

Examples of such mercaptans are n-butyl mercaptan, tert.-dodecyl mercaptan, thiophenol, thioglycolic acid ester, and mercaptoethanol, but also polyfunctional mercaptans having from 2 to 6 SH groups, for example esters of thioglycolic acid with monothioethylene glycol, ethylene glycol, glycerine, or pentaerythritol.

The chain transfer agents XY may include halogen-containing compounds, such as $CCl_4$ or benzyl bromide, in which case the end group Y is a halogen atom. However, halogen-free chain transfer agents, and in particular mercaptans or hydrocarbons with a labile hydrogen atom, for example cumene, are preferred. Chain transfer agents of the type X—H are therefore particularly preferred.

Polymethyl methacrylate molding compositions in accordance with the invention thus are compositions made up of over 80 percent by weight of methyl methacrylate, and particularly compositions with more than 95 percent, and preferably with from 98 to 100 percent of methyl methacrylate as a monomeric building block, and which optionally contain further comonomers of the type listed above, such as acrylonitrile or methacrylonitrile, esters and amides of acrylic acid or methacrylic acid, styrene, para-methylstyrene, vinyl esters or amides, or maleic acid or derivatives thereof, and which are thermally stabilized by the end groups cited, that is, compositions which have a TD value of over 290° C. The TD value is the temperature, measured in °C., at which a polymer specimen during a dynamic gravimetric measurement in a vacuum with a rate of temperature increase of 5° C./minute exhibits a weight loss of 2 percent.

FIG. 1 of the accompanying drawings shows the thermal decomposition properties of a polymer made according to the present invention (cf. Example 1) as a plot of sample weight loss versus temperature, from which plot the TD value can be determined.

Figure 4:
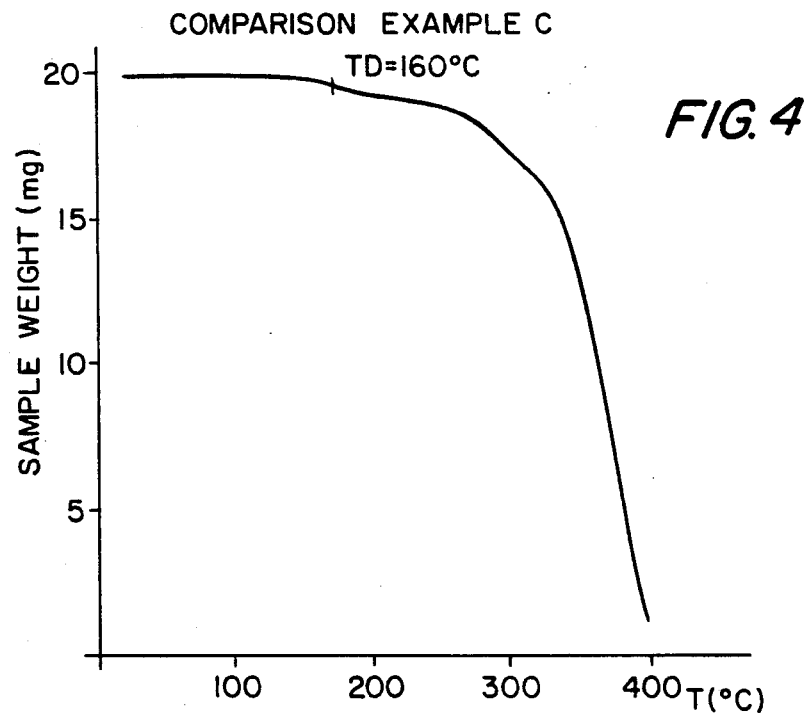

FIGS. 2, 3, and 4 of the accompanying drawings are similar plots showing the thermal decomposition properties of three polymers prepared by methods different from those of the invention (cf. Examples 6–8, which are comparison examples).

The new molding composition is produced in accordance with the invention by emulsion polymerization at temperatures between 0° C. and 100° C., and preferably between 20° C. and 90° C. General descriptions of the polymerization methods will be found in the pertinent literature mentioned earlier, for example, *Methoden der organischen Chemie* XIV/1 (1961), pp. 1048–1053, or *Ullmanns Enzyklopädie der technischen Chemie*, 4th Ed., Vol. 19, pp. 11–13 and 24. The polymerization is preferably carried out with exclusion of oxygen. (Operation under carbon dioxide or nitrogen, in closed equipment without a gas phase, etc.)

Suitable polymerization initiators are water soluble peroxygen compounds such as alkali metal persulfates or hydrogen peroxide, for example, but also organic peroxides such as tert.-butyl peroxypivalate, azo initiators such as AIBN, or redox systems such as sodium pyrosulfite/potassium persulfate. The polymerization may also be initiated photochemically.

The type of initiator used is not so much of importance in the production of the inventive thermostable polymethacrylate molding compositions with high heat distortion temperature as is the amount of the initiator. Thus, care should be taken that the kinetic chain length is as great as possible. (The kinetic chain length, 2 indicates how many monomer molecules can be added to a radical before the latter is destroyed by a termination reaction. Cf. H. G. Elias, *Makromolekule* ("Macromolecules"), 2nd Ed., p. 461; Hüthig & Wepf, Basel/Heidelberg.

In the production of the molding compositions of the invention, the kinetic chain length is at least 1000. The polymerization is preferably run so that at least 10,000 monomers, and more preferably at least 100,000 monomers, are added to a radical before it is deactivated by chain termination. (This corresponds to a kinetic chain length of at least 10,000 or 100,000, respectively).

The molecular weight of the polymers is held within the range of about 30,000 to 500,000 g/mole by means of the chain transfer agent X-Y. These are weight average molecular weights determined by gel permeation chromatography and light scattering. (For pure polymethyl methacrylate with a molecular weight of the monomer of 100 g/mole, this corresponds to about 300 to 5000 monomer units per polymer molecule). In accordance with the reaction conditions, the polymer chain is terminated with Y while X starts a new polymer chain.

As a simple comparison (monomer units per polymer molecule/kinetic chain length) will show, the kinetic chain length is, in accordance with the invention, greater than the number of monomer units per polymer molecule. For example, a polymethyl methacrylate polymer in accordance with the invention has about 300 to 5000 monomer units in kinetic chain length is greater than 1000, and preferably greater than 10,000, and most preferably greater than 100,000. In other words, each individual initiator radical produces, statistically speaking, at least 50 polymer molecules.

So far as the actual performance of the emulsion polymerization is concerned, this means that in accordance with the invention it is carried out with the smallest possible amount of initiator.

Based on the total weight of the monomers used, the weight of the initiator is therefore limited to 0.0001 to 1 percent, and preferably 0.001 to 0.2 percent, and most preferably to 0.002 to 0.05 percent.

An essential characteristic of the invention is that at least 90 percent by weight of the entire polymer is produced with this small amount of initiator. It is perfectly in keeping with the invention to start the emulsion polymerization with a relatively large amount of initiator, for example 0.3 percent, in order to eliminate the inhibitors and stabilizers present in the system, if there is assurance that more than 90 weight percent of the polymer is produced with considerably less initiator. This will be the case, for example, when a fast reacting redox initiator system such as potassium persulfate/sodium bisulfite/iron is employed. (See also the following Examples). In that case, it can be assumed that during the starting phase, that is before 10 weight percent of the monomer used has polymerized, more than 90 percent by weight of the redox system employed has already decomposed, so that the more than 90 percent by weight remaining of the polymer will be produced with less than 0.03 percent by weight of initiator. Therefore, care should be taken that the polymerization, once started, is not interfered with by constantly adding appreciable amounts of initiator.

Thus, it is not within the method of the invention to add to the polymerizing mixture monomers or monomer emulsions which contain appreciable amounts of stabilizer and, by way of compensating therefor, to rely on the constant decomposition of initiator for the continuation of polymerization. Rather, if monomers are to be added at all to the polymerizing mixture, it is in conformity with the invention that these be added as nearly free of oxygen and of inhibitors as possible. Advantageously, the polymerizing mixture already contains at least 45 percent, and preferably 90 percent, by weight of the total monomers before 20 percent, and preferably 10 percent, by weight of the monomers have polymerized. However, it is highly preferable initially to charge all salts, emulsifiers, monomers, chain transfer agents, initiators, the water, etc., together, as a batch, to a stirred-tank reactor. After a short period of inhibition due to the residual polymerization inhibitors present in the system and to the small amount of initiator used, polymerization will start. In a preferred embodiment, the water, the monomers, and all auxiliary substances thus are introduced into the reactor as an initial charge at a low temperature ranging from 0° C. to 40° C., for example, and the reaction is started by the addition of the small amount of initiator, with polymerization then proceeding.

As a rule, the cooling capacity of the stirredtank reactor will not suffice to maintain the polymerization at a temperature of, say, 30° C. Rather, the heat of polymerization will heat the reaction mixture to about 70° C.

After the reaction mixture has cooled to room temperature, more monomer, chain transfer agent, emulsifier, initiator, and optional further auxiliaries may be added and the polymerization started anew. The first polymerization stage then serves as a seed latex for the second reaction stage. An attractive feature of this two step batch production is that it makes it possible to obtain, through the addition of a further finely divided synthetic resin dispersion, an end product having latex particles with a bimodal or, generally, multimodal particle size distribution. Such a polymethyl methacrylate dispersion with multimodal particle size distribution makes for an economical polymer/water ratio in the dispersion. Generally speaking, dispersions with a solids content of over 30 percent, preferably over 45 percent, and most preferably over 50 percent by weight, are preferred. The particle size (diameter) of the latices will range from 50 to 2000 nanometers and preferably ranges from 100 to 600 nm.

The emulsion polymerization can also be carried out continuously, for example in cascaded stirred tank reactors or in a tubular reactor. Bearing in mind the limitation mentioned earlier, namely that the monomer mixture or monomer emulsion added be as nearly free of oxygen and inhibitor as possible, the emulsion polymerization may also be conducted with gradual monomer or emulsion addition. This latter emulsion polymerization method is of interest especially in the case of monomer mixtures having widely differing copolymerization parameters since this addition procedure can prevent the formation of chemically highly nonuniform polymers. The addition may also be carried out as a continuous flow addition, preferably in cascaded stirred tank reactors.

All these methods have one thing in common: The polymerization is carried out in the preferred temperature range from 0° C. to 100° C. with as little initiator as possible.

The molecular weight of the polymethacrylate molding compositions of the invention is controlled with chain transfer agents, preferably mercaptans. To this end, the latter are used in amounts ranging from 0.01 to 5 percent, preferably from 0.1 to 2 percent, and most preferably from 0.2 to 1 percent, by total weight of the monomers.

This establishes a very definite ratio of chain transfer agent to initiator for the production in accordance with the invention of polymethacrylate compositions having high heat distortion temperature and high thermal stability, namely from 2:1 to 100,000:1, preferably from 15:1 to 10,000:1, and most preferably from 20:1 to 1000:1.

For the performance of the emulsion polymerization, anionic, cationic, or nonionic low molecular weight emulsifiers of the surfactant type commonly used for the preparation of synthetic resin dispersions, or compatible mixtures of such emulsifiers, are employed.

The emulsifier content usually ranges from 0.01 to 1 percent, and preferably from 0.05 to 0.5 percent, by weight of the monomer used.

To facilitate handling of the dispersions, small amounts of salts or buffering agents may be added during the emulsion polymerization. The addition of minor amounts of inert solvents, for example a few percent of butyl acetate, may also prove advantageous, especially for smooth final polymerization.

Often it will be of advantage to add a low molecular weight stabilizer directly to the dispersion after polymerization has been completed to facilitate its incorporation into a molding composition.

The emulsion polymer is isolated from the latex obtained by known methods, for example by spray drying, freeze drying, or by coagulation, filtration, and drying. A particularly preferred method of separating a polymer from a latex is known from published German Patent Application DOS 29 17 321. It consists in the coagulation and dewatering of the latex in a screw extruder, which will then deliver a molten polymer extrudate. The solid polymer can advantageously be recovered also by freeze coagulation.

After the dispersed polymer has been isolated, preferably by extruder pinch-off, a polymer is obtained which, depending on the chosen process parameters, and depending especially on the amount of chain transfer agent and the ratio of initiator to chain transfer agent used, has a solution viscosity of $\eta_{sp/c}$ in conformity with DIN 51562 ranging from 30 to 200 ml/g, and more particularly from 40 to 150 ml/g, as determined in chloroform at 20° C. The value for thermal degradation, the TD value, of over 290° C., indicates that such a material possesses the requisite resistance to thermal degradation at processing ( temperatures which are in the 270° C. range in extrusion and which in injection molding are momentarily as high as 320° C., so that the properties of the material in practice are not adversely affected by thermoplastic processing.

The Vicat softening point, determined in conformity with DIN 53460, of the pure PMMA molding compound of the invention is as high as 122° C. and thus considerably higher than the 108° C. which is regarded as the guide value for the Vicat softening point of commercial polymethacrylate molding compositions. The potential uses of the material in many fields of use, and especially in the lighting sector, are therefore considerably broadened. Mechanical strength and corrosion resistance are increased. Optical measurements on unpigmented molded articles give light transmittances in conformity with DIN 1349 of at least 91 percent.

Infrared and $^{13}$C. NMR spectroscopic measurements of the inventive polymers show that their content of syndiotactically linked methyl methacrylate units is usually greater than 60 percent of syndiotactic triads. The content of isotactic triads is less than 6 percent.

Uses of the Novel Molding Compositions

The novel polymethyl methacrylate molding compositions can be thermoplastically processed at temperatures between 160° C. and 300° C., and preferably between 200° C. and 290° C., to give molded articles, sheets, or foils by extrusion, injection molding, compression molding, etc.

The thermoplastically processable polymethacrylate molding compositions of the invention are primarily used where high processing stability, high heat deformation temperature, low residual monomer content in the finished molded article, and high light transmittance are required.

Therefore, a preferred area of use is as heavy duty lamp covers and automobile headlight covers as well as the entire houshould sector where the combination of high heat distortion temperature and low residual monomer content comes into play. The outstanding weathering resistance of the novel molding composition opens up other possible fields of use. Thus, the novel molding composition having a high heat deformation temperature can be used to advantage in coextrusion or co-injection molding with polycarbonate. The intrinsically good mechanical strength can be improved by admixture with impact strength modifiers. The composition can also be readily blended with other synthetic resins for the purpose of modifying their heat deformation temperature or other properties.

Of special interest is, further, that the surface of molded articles produced from the inventive composition can be modified, for example scratchproofed. Because of the good weathering resistance of the novel molding composition, a polysiloxane based scratch resistant coating (for example, "ACRIPLEX 100 SR") can be applied directly to the surface and will be weather resistant. The curing of the scratch resistant coating can be carried out at an elevated temperature, which makes for shorter curing times.

A better understanding of the present invention and of its many advantages will be had by referring to the following specific Examples, given by way of illustration.

EXAMPLE 1

60 g of the sodium salt of a mixture of hexadecane- and tetradecane-sulfonic acids,
15 g of potassium persulfate,
0.03 g of ferrous sulfate,
44,000 g of distilled water,
30,000 g of methyl methacrylate, and
180 g of 2-ethylhexyl thioglycolate are charged to a 100-liter stirred-tank reactor under a nitrogen atmosphere.

Polymerization is started at a temperature of about 25° C. by the addition of 2.5 g sodium bisulfite. Ater a short period of inhibition, the internal temperature gradually rises. One hour after the start of the reaction, another 120 g of the above emulsifier, dissolved in 500 g of water, are added. The batch is maintained at a temperature of under 30° C. by cooling until about 50 percent of the monomers have been polymerized. The temperature is then allowed to rise to about 60° C.

Solids content of the dispersions obtained: about 40 weight percent.

Recovery of Solid Polymer by Freeze Coagulation 5 kg of the dispersion described above are frozen at −16° C. After thawing, the solid is filtered off, washed with water and dried. A PMMA powder with a residue monomer content of 0.06 weight percent is obtained. The polymer has a solution viscosity, $\eta_{spec/c}$, of 57 ml/g.

The powder is submitted to a thermal stability measurement. (See FIG. 1).
Syndiotactic triads=63%.
Isotactic triads=2%.
TD=305° C.

From the powder, a compression molded plaque 3 mm thick is produced.
Vicat softening point=117° C.

EXAMPLE 2

A polymethyl methacrylate dispersion is prepared as in Example 1. However, the solid polymer is recovered by coagulation and dewatering of the latex in a screw extruder, which delivers a molten strand of polymer.

The extruded product was obtained by dewatering the latex in a pilot plant double coil extruder at a temperature from 230° C. to 170° C. at an extruder rotation of 45 rpm with a throughput of about 10 kg/hr. of dispersion followed by degassing at 260° C.−240° C. at a pressure less than 200 mbar.

A colorless, crystal clear granular material is obtained.
$\eta_{spec/c}1=57$ ml/g
TD=305° C.
Residual monomer content less than 0.1% by weight.
The granules are used to extrude a plaque 2 mm thick. A Vicat softening point of 119° C. is measured on the plaque. The plaque has a residual monomer content of 0.1 percent MMA.

EXAMPLE 3

A portion of the solid polymer obtained in accordance with Example 2 is stabilized with 0.1 weight percent of octadecyl-3-(3,5-di-tert.-butyl-4-hydroxyphenyl)-propionate.

The granular material containing this stabilizer is used to injection mold a test specimen 3 mm thick. Measurement of the heat distortion temperature results in a Vicat softening point of 117° C. Residual monomer content: 0.29 percent MMA.

EXAMPLE 4

The PMMA plaque produced in accordance with Example 2 is coated on both sides with a polysiloxane based scratch resistant coating composition ("ACRI- PLEX 100 SR"). The scratch resistant coating is cured at 110° C. A flat, undeformed, crystal clear, highly scratch resistant polymethacryl plaque is so obtained. Light transmittance: 94 percent.

EXAMPLE 5

In a glass flask,
2000 g of distilled water,
1.6 g of the sodium salt of a mixture of hexadececane- and tetradecane-sulfonic acids,
400 g of methyl methacrylate, and
2 g of 2-ethylhexyl thioglycolate
are emulsified and heated to 76° C. under an argon atmosphere. Polymerization is started by the addition of 0.2 g of potassium persulfate dissolved in 20 g of water. The temperature in the reaction vessel is held below 82° C. by cooling. After completion of the strongly exothermic reaction, stirring is continued for another 2 hours at 70° C.

A stable dispersion is obtained from which the washing and drying.

Residual monomer content in the powdered polymer: less than 0.01 percent methyl methacrylate.
$\eta_{spec/c} = 54$ ml/g.
Vicat softening point: 117° C., measured on a compression molded plaque.
Thermal stability: TD=310° C.

EXAMPLE 6

Comparison Example A
(Monomer addition; no chain transfer agent)
2000 g of distilled water and
6 g of sodium salt of a mixture of hexadecaneand tetradecane-sulfonic acids
are heated to 80° C. in a reaction vessel flushed with argon. Following the addition of 3 g of potassium persulfate, 400 g of methyl methacrylate are gradually added dropwise. (Temperature in the reaction vessel, 76° C. to 80° C.). In the course of the reaction, another 12 g of the above emulsifier is added. Reaction time: 4 hours. The dispersion is then worked up as described under Example 5.

A powdered polymer with $\eta_{spec/c} = 102$ ml/g is obtained which can be compression molded into plaques. Vicat softening point: 113° C. However, the polymer is thermally extremely unstable. TD=251° C. Degradation occurs in several stages beginning at 158° C. (See FIG. 2).

EXAMPLE 7

Comparison Example B
(Monomer addition: no chain transfer agent; 2 percent of acrylate as a comonomer for "thermal stabilization")
300 g of distilled water,
0.3 g of the emulsifier mixture named under Example 6, and
0.75 g of potassium persulfate
are introduced into a reaction vessel as an initial charge at 80° C. under an argon atmosphere. A monomer mixture of 98 g of methyl methacrylate and 2 g of methyl acrylate is then added dropwise to this initial charge over a 2 hour period. Recovery of solid polymer is as described in Example 5. A molding composition with low heat distortion temperature and low thermal stability is obtained. (See FIG. 3). $\eta_{spec/c} = 59$ ml/g. Vicat softening point: 98° C. TD: 170° C. Degradation occurs in several stages beginning at 155° C.

EXAMPLE 8

Comparison Example C
(Ratio of initiator to chain transfer agent not in accordance with the invention)

In a reaction vessel according to Example 6, a polymethyl methacrylate dispersion is prepared at 80° C., with gradual addition of the emulsion over 4 hours at 80° C.

Monomer: 100 percent methyl methacrylate
Chain transfer agent: 0.07 percent of 2-ethylhexyl thioglycolate
Initiator: 0.15 percent azo-bis-4-valeric acid (sodium salt)

A dispersion with a solids content of 45 percent is obtained from which the polymer is recovered by spray drying.

$\eta_{spec/c} = 130$ ml/g

A molding composition with low thermal stability is obtained. (See FIG. 4). TD=160° C. Degradation occurs in several stages.

What is claimed is:

1. A method for making a thermoplastically processable polymer which comprises emulsion polymerizing, in the absence of a dispersing agent, at least 80 percent by weight of methyl methacrylate monomer with up to 20 percent by weight of at least one other monomer copolymerizable therewith in an aqueous phase at a temperature from 0° C. 100° C. in the presence of a polymerization initiator and a chain transfer agent in a molar ratio from 1:2 to 1:100,000, said chain transfer agent being from 0.01 to 5 percent by weight of said monomers, to form a polymer latex wherein the polymer particles have a diameter from 50 to 2000 nanometers, and then separating said polymer and said aqueous phase.

2. A method as in claim 1 wherein said initiator/chain-transfer agent ratio is from 1:5 to 1:100,000 moles/mole.

3. A method as in claim 1 wherein said initiator/chain-transfer agent ratio is from 1:10 to 1:1000 moles/mole.

4. A method as in claim 1 wherein the amount of said initiator is from 0.0001 to 1 percent by weight of said monomer or monomers.

5. A method as in claim 1 wherein the amount of said initiator is from 0.001 to 0.2 percent by weight of said monomer or monomers.

6. A method as in claim 1 wherein the amount of said initiator is from 0.002 to 0.05 percent by weight of said monomer or monomers.

7. A method as in claim 1 wherein more than 45 percent by weight of said monomer or monomers are present in said aqueous phase before 20 percent by weight of said monomer or monomers have polymerized.

8. A method as in claim 1 wherein more than 90 percent by weight of said monomer or monomers is present in said aqueous phase before 10 percent by weight of said monomer or monomers have polymerized.

9. A method as in claim 1 carried out as a continuous process in a continuously operating emulsion polymer unit and said monomer or monomers is added at no more than three different points of said unit.

10. A method as in claim 1 carried out as a continuous process in cascade of stirred tank reactors.

11. A method as in claim 1 carried out in a tubular reactor.

12. A method as in claim 1 wherein said polymer and aqueous phase are separated by freeze coagulation.

13. A method as in claim 1 wherein said polymer and aqueous phase are separated by extruder pinch-off.

* * * * *

UNITED STATES PATENT AND TRADEMARK OFFICE
CERTIFICATE OF CORRECTION

PATENT NO. : 4,877,853

DATED : October 31, 1989

INVENTOR(S) : Siol et al.

It is certified that error appears in the above-identified patent and that said Letters Patent is hereby corrected as shown below:

Column 4, after line 56, insert the following: -- other end of the molecule, the end group Y, preferably a --.

Column 6, line 15, replace the Arabic numeral "2" by the symbol for the Greek letter "nu", -- $\nu$ --.

Signed and Sealed this

Sixteenth Day of April, 1991

Attest:

HARRY F. MANBECK, JR.

Attesting Officer

Commissioner of Patents and Trademarks